(12) United States Patent
Turner

(10) Patent No.: US 7,477,828 B2
(45) Date of Patent: Jan. 13, 2009

(54) OPTICAL WAVEGUIDE

(75) Inventor: Mark A. Turner, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 0 days.

(21) Appl. No.: 11/327,562

(22) Filed: Jan. 6, 2006

(65) Prior Publication Data

US 2008/0199143 A1    Aug. 21, 2008

(51) Int. Cl.
    *G02B 6/10*    (2006.01)
(52) U.S. Cl. .............................. 385/146; 385/39; 385/43
(58) Field of Classification Search .................. 385/146
    See application file for complete search history.

(56) References Cited

U.S. PATENT DOCUMENTS

| | | | | |
|---|---|---|---|---|
| 3,437,804 | A * | 4/1969 | Schaefer et al. ............. | 362/551 |
| 4,181,398 | A * | 1/1980 | Sick ....................... | 250/227.11 |
| 4,240,692 | A * | 12/1980 | Winston ...................... | 385/146 |
| 4,752,115 | A * | 6/1988 | Murray et al. ................ | 385/12 |
| 4,807,954 | A   | 2/1989 | Oyamada et al. | |
| 4,946,239 | A * | 8/1990 | Garmon ....................... | 385/43 |
| 5,166,992 | A * | 11/1992 | Cassidy et al. ................ | 385/24 |
| 5,696,865 | A * | 12/1997 | Beeson et al. ................ | 385/146 |
| 6,751,388 | B2* | 6/2004 | Siegman ...................... | 385/124 |
| 7,095,924 | B2* | 8/2006 | De Barros et al. ............. | 385/37 |
| 2001/0012429 | A1 | 8/2001 | Wach et al. | |
| 2001/0033726 | A1 | 10/2001 | Shie et al. | |
| 2002/0140348 | A1 | 10/2002 | Takeuchi et al. | |
| 2003/0118310 | A1* | 6/2003 | Steinberg et al. ............. | 385/132 |
| 2006/0188211 | A1* | 8/2006 | Iwase et al. .................. | 385/137 |

OTHER PUBLICATIONS

International Search Report from corresponding International Patent Application PCT/US07/60089.
Written Opinion of the International Searching Authority from corresponding International Patent Application PCT/US07/60089.

* cited by examiner

*Primary Examiner*—Sung H Pak
*Assistant Examiner*—Chad H Smith
(74) *Attorney, Agent, or Firm*—Daren C. Davis; James E. Walton

(57) ABSTRACT

An optical waveguide includes a first end surface; a second end surface, such that the second end surface is smaller than the first end surface; and a body extending between the first end surface and the second end surface, the body defining a complexly-contoured outer surface. An optical waveguide includes a first end surface; a second end surface, such that the second end surface is smaller than the first end surface; and a body extending between the first end surface and the second end surface, the body comprising one of a gradient-index material and a step-index material.

30 Claims, 8 Drawing Sheets

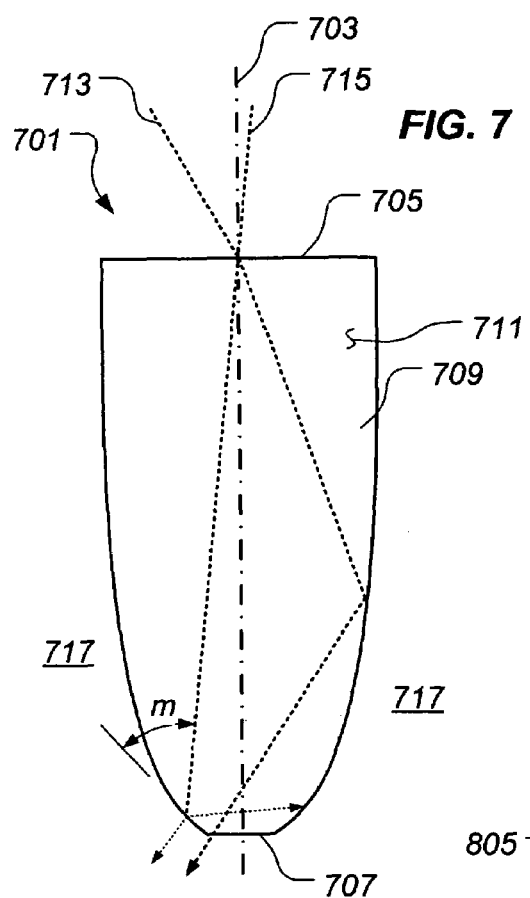
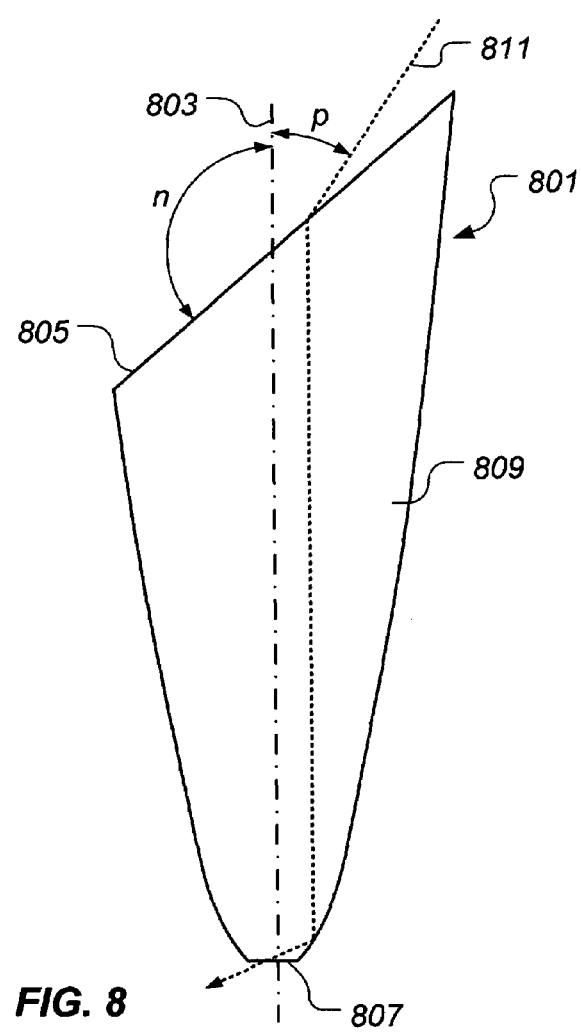
FIG. 7
FIG. 8

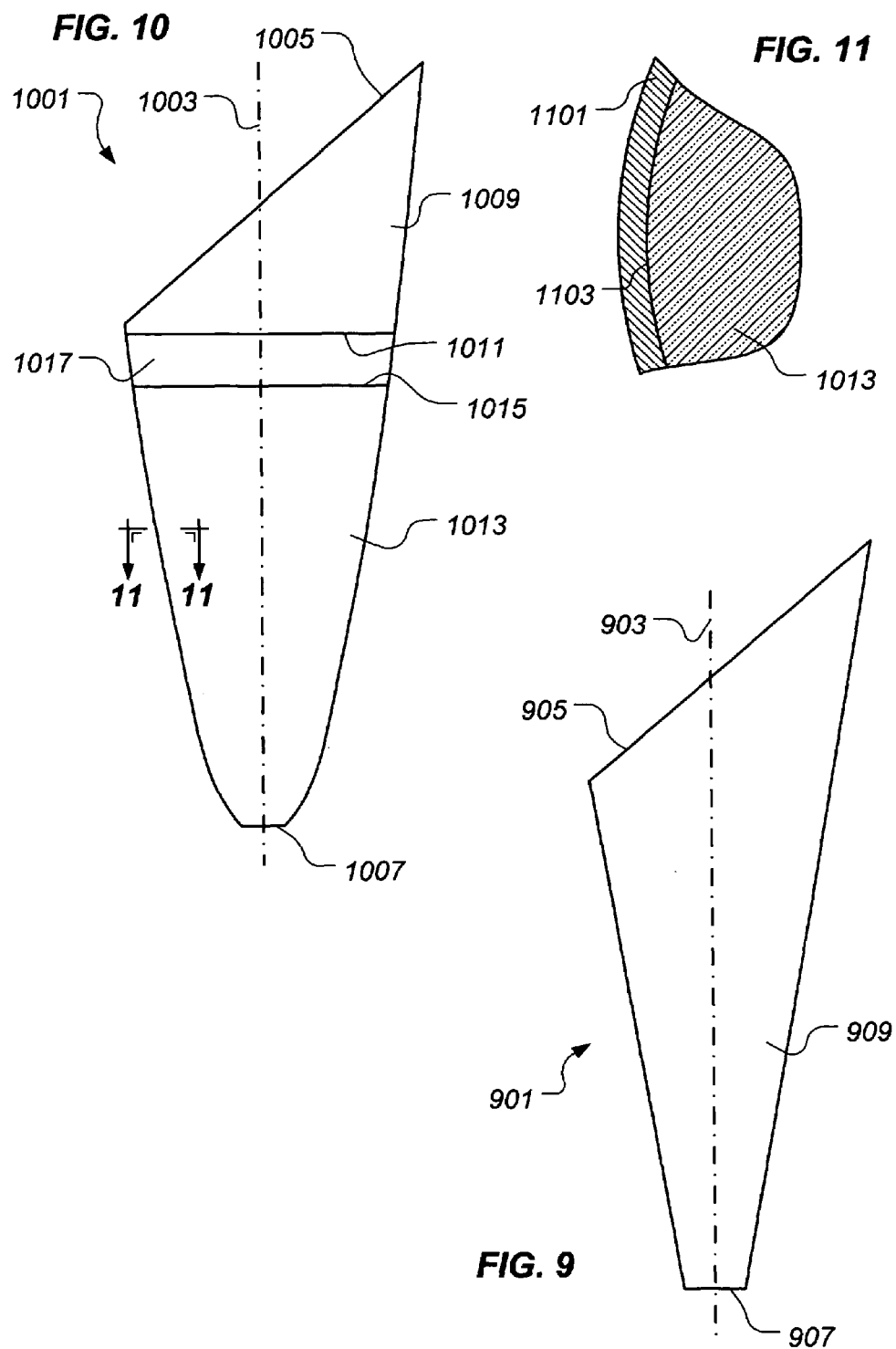

OPTICAL WAVEGUIDE

BACKGROUND

1. Field of the Invention

The present invention relates to optical waveguides.

2. Description of Related Art

Many modern devices incorporate optical waveguides. Generally, an optical waveguide is any structure having the ability to guide the flow of radiant energy, such as light, along a path parallel to the structure's optical axis and having the ability to contain the energy within or adjacent to the structure's surface. Examples of optical waveguides include optical fibers, light pipes, and the like. Such optical waveguides often comprise glass, acrylic, or the like.

FIG. 1A depicts an exemplary, conventional, frustoconical, optical waveguide 101. Such frustoconical optical waveguides are used, for example, to collect light from a larger aperture and concentrate the light at a smaller aperture. Light enters optical waveguide 101 at an optical entrance 103. If a light wave entering optical waveguide 101 at optical entrance 103 is substantially collimated, i.e., every ray of the light wave is substantially parallel to one another, and the collimated light wave is parallel to an optical axis 105 of optical waveguide 101, substantially all of the collimated light wave exits optical waveguide 101 at an optical exit 107. In other words, the amplitude of the light wave entering optical waveguide 101 at optical entrance 103 is substantially the same as the amplitude of the light wave exiting optical waveguide 101 at optical exit 107.

For example, as shown in FIG. 1A, a light ray 109 of the collimated light wave enters optical waveguide 101 at optical entrance 103 and propagates substantially unattenuated through optical waveguide 101 and optical exit 107 without encountering an outer surface 111 of optical waveguide 101. A light ray 113 of the collimated light wave enters optical waveguide 101 at optical entrance and propagates through optical waveguide 101 but encounters outer surface 111, generally at 115. At 115, light ray 113 is totally, internally reflected and propagates through optical exit 107.

Total internal reflection occurs when light is refracted or bent at a medium boundary enough to send it backwards, effectively reflecting the entire ray. When a light ray propagates across a boundary surface (e.g., outer surface 111) between materials with different refractive indices, the light ray will be partially refracted at the boundary surface and partially reflected. However, if the angle of incidence (e.g., angle a) is shallower (closer to the boundary) than the critical angle, then the light ray will stop crossing the boundary altogether and, instead, totally reflect back internally within optical waveguide 101. The critical angle is the angle of incidence wherein a light ray is refracted so that the light ray travels along the boundary between the media and is defined as:

$$\theta_c = \sin^{-1}\left[\frac{n_1}{n_2}\right],$$

wherein $\theta_c$ is the critical angle, $n_1$ is the refractive index of the less dense material, and $n_2$ is the refractive index of the more dense material. Total internal reflection can only occur where a light ray propagates from a denser medium to a less dense medium, i.e., from the medium with a higher refractive index to a medium with a lower refractive index. For example, total internal reflection will occur when a light ray propagates from glass to air, but not when the light ray propagates from air to glass.

In the example illustrated in FIG. 1A, as in all optical waveguides, optical waveguide 101 comprises a material having a higher refractive index than a medium 117 in which optical waveguide 101 is disposed. Since the angle of incidence a between light ray 113 and outer surface 111 is less than the critical angle for the interface or boundary between optical waveguide 101 and medium 117, light ray 113 is totally internally reflected within optical waveguide 101, as depicted in FIG. 1A, if outer surface 111 contains no optical defects. In a practical sense, however, outer surface 111 will contain optical defects and, thus, the amplitude of light ray 119 is somewhat attenuated at each encounter with outer surface 111. Accordingly, a light ray 118 entering optical waveguide 101 will exit optical waveguide 101, but only after encountering, and being reflected by, outer surface 111 a plurality of times. Because of the inherent optical defects in outer surface 111, the amplitude of light ray 118 is more attenuated in optical waveguide 101 than the amplitude of light ray 113 or light ray 109. Correspondingly, the amplitude of light ray 113 is more attenuated in optical waveguide 101 than light ray 109.

Even if the light wave entering optical waveguide 101 through optical entrance 103 is not collimated light, the amplitude of the light wave exiting optical waveguide 101 through optical exit 107 may be substantially undiminished. For example, as shown in FIG. 1B, a light ray 119 enters optical waveguide 101 at an angle b and is refracted at an angle c at optical entrance 103 because medium 117 exhibits a lower refractive index than optical waveguide 101. Note that, optical axis 105 is perpendicular to optical entrance 103. Snell's law characterizes optical refraction, in that:

$$n_1 \sin(\theta_1) = n_2 \sin(\theta_2),$$

wherein:

$n_1$ is the refractive index of a first material (e.g., medium 117);

$\theta_1$ is the angle of incidence (e.g., angle b) of a light ray in the first material (e.g., ray 119 in medium 117);

$n_2$ is the refractive index of a second material (e.g., light ray 119 in waveguide 101); and $\theta_2$ is the angle of refraction (e.g., angle c) of the light ray in the second material.

Light ray 119 encounters outer surface 111 of optical waveguide at angle d, generally at 121. Because, in the illustrated example, angle d is less than the critical angle for the boundary between optical waveguide 101 and medium 117, light ray 119 is totally internally reflected within optical waveguide 101 and exits optical waveguide 101 through optical exit 107 substantially unattenuated, except for attenuation due to optical defects in outer surface 111.

At greater angles of incidence at optical entrance 103, however, the amplitude of a light ray may be further attenuated as the light ray propagates through optical waveguide 101. For example, as illustrated in FIG. 1C, a light ray 123 strikes optical entrance 103 at an angle of incidence e and is refracted at optical entrance 103 at an angle of refraction f. Light ray 123 propagates further through optical waveguide 101, encountering outer surface 111 generally at 125 and at 127. At 127, however, light ray 123 strikes outer surface 111 an angle of incidence g, which exceeds the critical angle for the interface or boundary between optical waveguide 101 and medium 117. Accordingly, light ray 123 is split, with a first portion of light ray 123 being refracted into medium 117 as light ray 123' and a second portion of light ray 123 being reflected in optical waveguide 101 as light ray 123".

At each successive encounter of the remaining, reflected portion of light ray 123 (e.g., light ray 123") with outer surface 111 of optical waveguide 101, the remaining, reflected portion of light ray 123 is further split into a refracted component, propagating into medium 117, and a reflected component, reflected into optical waveguide 101. The remaining, reflected portion or component of light ray 123 is further split because the angle of incidence of the remaining, reflected portion of light ray 123 with outer surface 111 is greater than the critical angle of the interface or boundary between optical interface 101 and medium 117. Thus, light rays having larger angles of incidence upon optical entrance 103, such as light ray 123, are not totally, internally reflected within optical waveguide 101 but are substantially attenuated, if not completely attenuated (as illustrated in FIG. 1C), as light ray 123 propagates through optical waveguide 101.

As mentioned above, conventional, frustoconical, optical waveguides are often used to gather light at a larger aperture (e.g., optical entrance 103) and focus or concentrate the gathered light at a smaller aperture (e.g., optical exit 107). However, such optical waveguides are ineffective in applications wherein the light rays entering the larger aperture that are to be focused or concentrated at the smaller aperture are not totally, internally reflected within the optical waveguide. In some implementations, conventional, frustoconical, optical waveguides are used to concentrate or focus light onto a detector or other such electronic sensor. However, in some operational situations, the amplitude of the light exiting the optical waveguide onto the detector may be insufficient for the detector to properly operate, because a preponderance of the light rays striking the optical entrance of the optical waveguide have large angles of incidence at the optical entrance, as discussed above. In such situations, the orientation of the optical waveguide must be changed with respect to the direction at which the light rays are propagating, which may cause, for example, packaging problems. It should be noted that conventional, frustopyramidal, optical waveguides suffer from the same problems noted above with respect to conventional, frustoconical, optical waveguides.

While conventional, right-cylindrical, optical waveguides, such as a right-cylindrical, optical waveguide 201 of FIG. 2, do not generally suffer the problems described above, particular implementations of such optical waveguides do present other problems. For example, as illustrated in FIG. 2, optical waveguide 201 is disposed in housing 203 such that light, represented by an arrow 205, propagates through opening 207 defined by housing 203. Packaging constraints, however, may require optical waveguide 201 to be positioned such that an optical entrance 209 of optical waveguide 201 is not flush with housing 203. In implementations wherein housing 203 experiences high velocity fluid flow adjacent thereto, as represented by an arrow 211, a gap 213 between housing 203 and optical waveguide 201 may induce severe turbulence and undesirable turbulence-induced forces on housing 203. One example of such an implementation is in airborne or waterborne vehicles, such as missiles, rockets, aircraft, drones, torpedoes, and the like.

While there are many designs of optical waveguides well known in the art, considerable shortcomings remain.

SUMMARY OF THE INVENTION

There is a need for an improved optical waveguide.

Therefore, it is an object of the present invention to provide a improved optical waveguide.

In one aspect, the present invention provides an optical waveguide, including a first end surface; a second end surface, such that the second end surface is smaller than the first end surface; and a body extending between the first end surface and the second end surface, the body defining a complexly-contoured outer surface.

In another aspect of the present invention, an optical waveguide is provided. The optical waveguide includes a first end surface; a second end surface, such that the second end surface is smaller than the first end surface; and a body extending between the first end surface and the second end surface, the body comprising one of a gradient-index material and a step-index material.

In yet another aspect, the present invention provides an optical waveguide, including a first end surface non-perpendicular with respect to an optical axis of the optical waveguide; a second end surface; and a body extending between the first end surface and the second end surface.

In another aspect of the present invention, a seeker assembly is provided. The seeker assembly includes a housing defining an opening and an optical waveguide disposed in the opening. The optical waveguide includes an optical entrance non-perpendicular to an optical axis of the optical waveguide; an optical exit, the optical exit being smaller than the optical entrance; and a body extending from the optical entrance to the optical exit. A detector is disposed at the optical exit of the optical waveguide.

The present invention provides significant advantages, including: (1) providing a means for limiting the degree of attenuation of light intensity or amplitude as the light propagates through an optical waveguide; (2) providing means for redirecting light striking an optical entrance of an optical waveguide at an orientation that is not parallel to an optical axis of the optical waveguide; (3) providing means for selectively directing certain rays of light toward an optical exit; and (4) providing means for selectively directing certain rays of light away from an optical exit.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 7 is a stylized, side, elevational view of a fourth illustrative embodiment of an optical waveguide according to the present invention;

FIG. 8 is a stylized, side, elevational view of a fifth illustrative embodiment of an optical waveguide according to the present invention;

FIG. 9 is a stylized, side, elevational view of a sixth illustrative embodiment of an optical waveguide according to the present invention;

FIG. 10 is a stylized, side, elevational view of a seventh illustrative embodiment of an optical waveguide according to the present invention;

FIG. 11 is a cross-sectional view of a portion of the optical waveguide of FIG. 10, taken along the line 11-11 in FIG. 10;

Figure 1A:
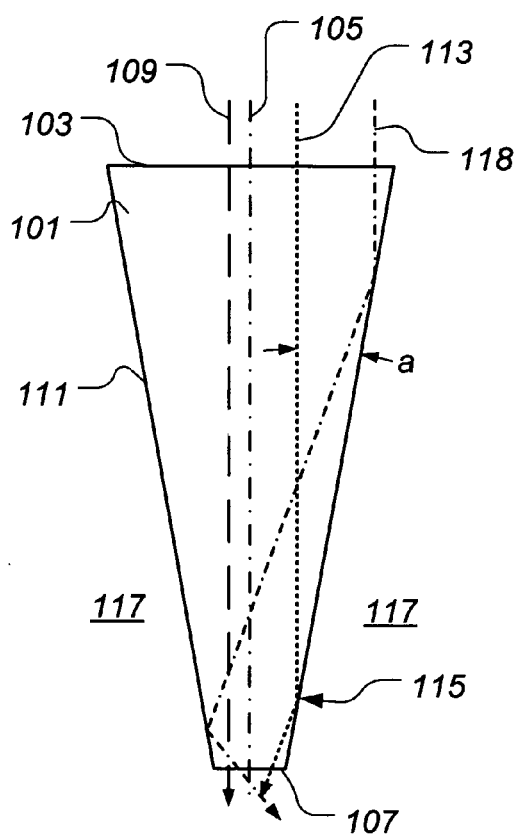
FIGS. 1A-1C are stylized, side, elevational views of a conventional, frustoconical, optical waveguides illustrating their operation.
Figure 1B:
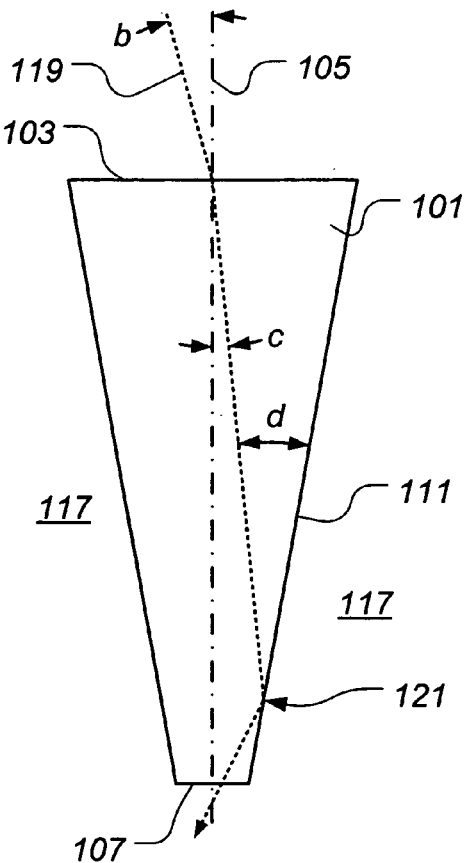
Figures 1C, 2:
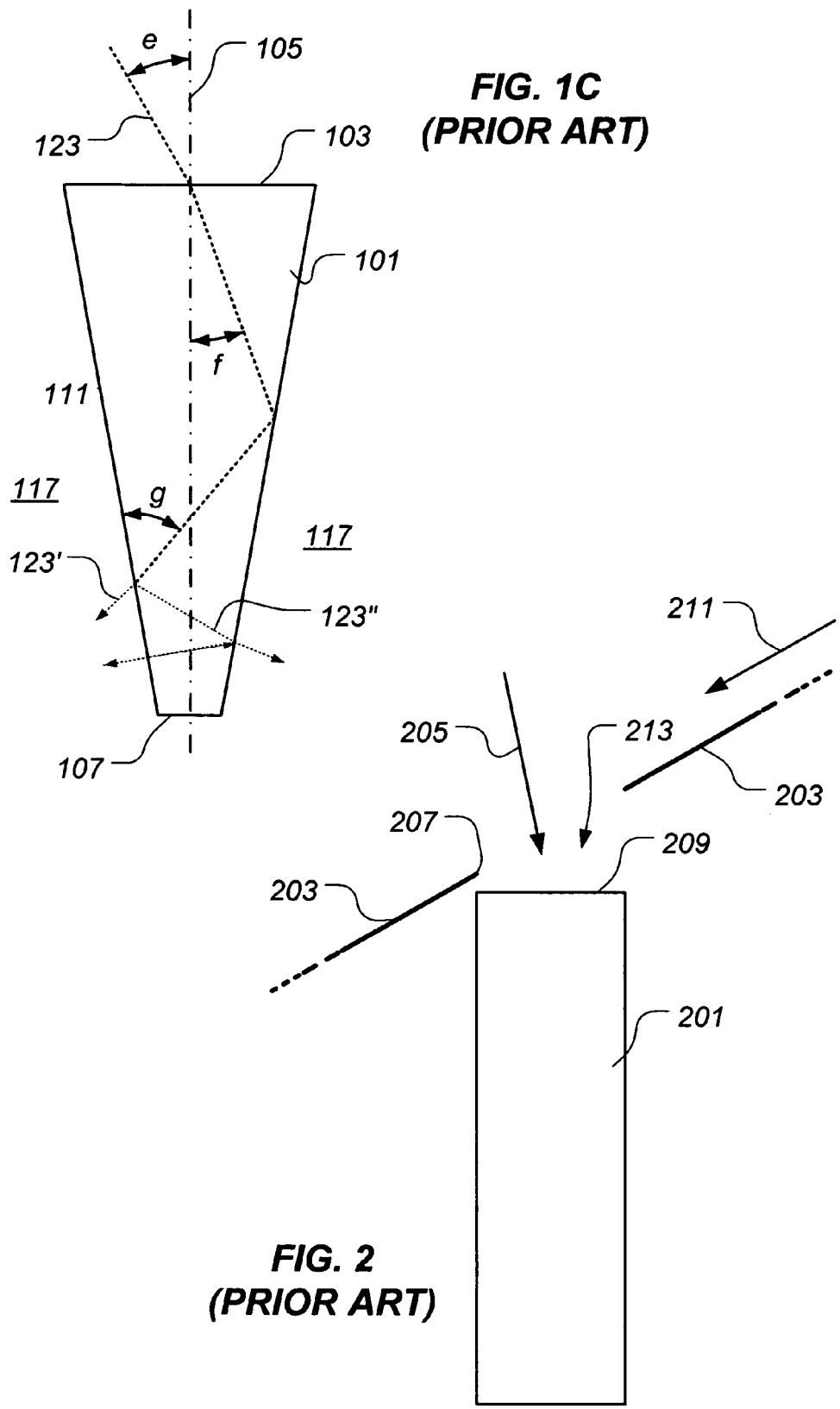
FIG. 2 is a stylized representation of a conventional, right-cylindrical, optical waveguide illustrating one particular use.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

It should be noted that the following terms and phrases are intended to have a particular meaning throughout the following detailed description. The term "optical waveguide" is intended to refer to a dielectric waveguide that is capable of guiding an optical signal. A "light pipe," which is transparent matter formed into a shape and through which light is channeled from one end to the other by total internal reflections, is one example of an optical waveguide. The term "total internal reflection" means the reflection that occurs within a substance because the angle of incidence of light striking a boundary surface is in excess of the critical angle. The term "angle of incidence" refers to the angle formed between a ray of light striking a surface and the normal to the surface at the point of incidence. A "light ray" or "ray of light" is one of the radii of a wave of light that indicates the direction of light travel.

Moreover, the term "critical angle" refers to the least angle of incidence at which total internal reflection takes place. The term "optically transmissive material" refers to a material that allows light to propagate therethrough. The term "index of refraction" means the ratio of the velocity of light in a vacuum to the velocity of light in a particular material for a given wavelength of light. The term "refraction" means the change in direction of a light wave due to a change in the velocity of the wave. A "surface of revolution" is a surface created by rotating a curve lying on some plane (i.e., a generatrix) around a straight line (i.e, an axis of rotation) that lies on the same plane as the curve. The term "complexly-contoured," as it relates to surfaces or shapes, is a surface or shape that is contoured in at least two directions. A "frustum of a paraboloid of revolution" is a part of a surface having parabolic sections parallel to a single coordinate axis and elliptic sections perpendicular to that axis.

Yet further, an "optical entrance" is a location at which light enters a device, such as an optical waveguide. An "optical exit" is a location at which light exits a device, such as an optical waveguide. An "optical axis" is, in a refractive or reflective optical element, the straight line that is coincident with the axis of symmetry of the surfaces. The term "reflection" refers to the return of light by a surface, without change in wavelength of the light. The term "cladding" refers to one or more layers of material in intimate contact with a member, such as a body of an optical waveguide. "Vehicles" are devices, apparatuses, or the like that travel through a medium, such as air or water. Examples of vehicles include, but are not limited to, missiles, rockets, torpedoes, airplanes, helicopters, automobiles, trucks, military tanks, and drones. The term "flush" means smooth or even within manufacturing tolerances.

Figure 3:
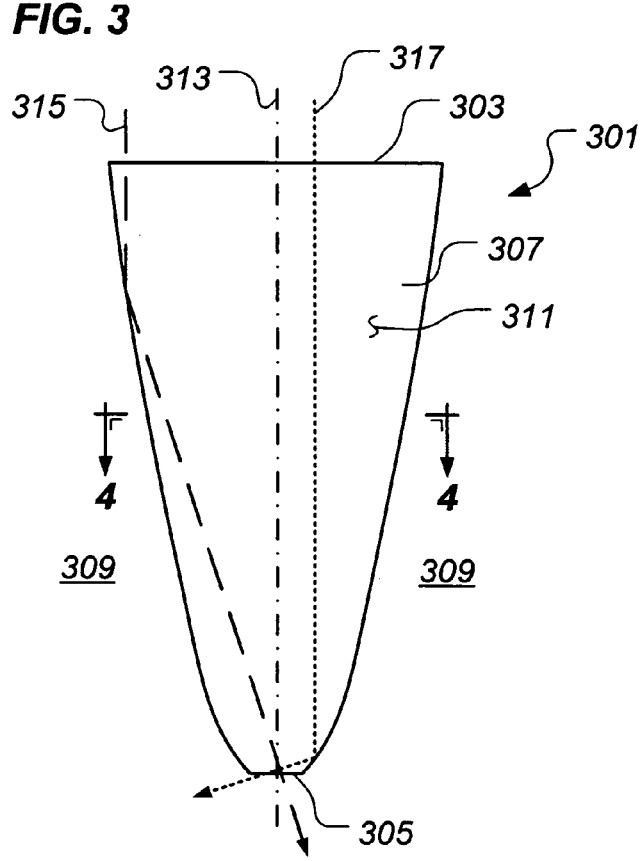
FIG. 3 is a stylized, side, elevational view of a first illustrative embodiment of an optical waveguide according to the present invention.

FIG. 3 depicts a stylized representation of a first illustrative embodiment of an optical waveguide 301 according to the present invention. Optical waveguide 301 comprises a first end surface 303, a second end surface 305, and a body 307 extending between first end surface 303 and second end surface 305. Optical waveguide 301 comprises an optically transmissive material having an index of refraction that is greater than an index of refraction of a medium 309 in which optical waveguide 301 is disposed. Accordingly, the material comprising optical waveguide 301 is chosen based upon at least the material of medium 309. For implementations wherein medium 309 comprises air, optical waveguide preferably comprises glass or a polymeric material, such as acrylic.

Figure 4:
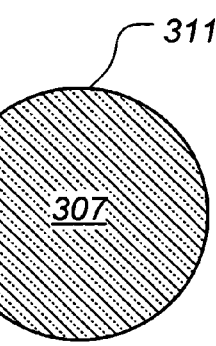
FIG. 4 is a cross-sectional view of the optical waveguide of FIG. 3 taken along the line 4-4 in FIG. 3.
Figure 5:
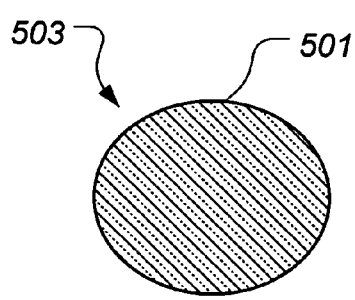
FIG. 5 is a cross-sectional view of second illustrative embodiment of an optical waveguide according to the present invention, alternate to the optical waveguide of FIG. 3.
Figure 6:
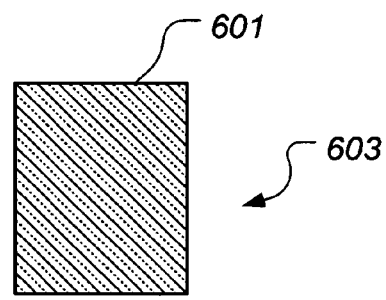
FIG. 6 is a cross-sectional view of third illustrative embodiment of an optical waveguide according to the present invention, alternate to the optical waveguide of FIG. 3.

In one implementation, an outer surface 311 of body 307 is a surface of revolution defined by a non-linear curve rotated about an optical axis 313 of optical waveguide 301. In such an embodiment, a cross-section of optical waveguide 301 taken substantially perpendicular to optical axis 313 reveals outer surface 311 to be generally circular in shape, such as shown in the cross-section of FIG. 4. The scope of the present invention, however, is not so limited. Rather, an outer surface, corresponding to outer surface 311, of an optical waveguide according to the present invention may be a surface of revolution defined by plurality of different curves that are each rotated partway about an optical axis, such as optical axis 313, of the optical waveguide, such that adjacent, generated surfaces are joined. In such an embodiment, a cross-section of the optical waveguide taken substantially perpendicular to the optical axis of the optical waveguide reveals the outer surface of the optical waveguide to be non-circular in cross-section. For example, in a second illustrative embodiment of the present invention depicted in FIG. 5, an outer surface 501 of an optical waveguide 503 exhibits an elliptical shape. Other embodiments, however, are within the scope of the present invention. For example, in a third illustrative embodiment of the present invention, an outer surface 601 of an optical waveguide 603, has a rectangular shape in cross-section, as illustrated in FIG. 6.

Referring again to FIG. 3, outer surface 311 exhibits a complexly-contoured shape. The particular shape of outer surface 311 is highly dependent upon the particular implementation of optical waveguide 301. In one particular preferred embodiment, outer surface 311 is a frustum of a paraboloid of revolution. Other shapes, however, may be preferred in other implementations and are encompassed within the scope of the present invention.

One particular implementation of optical waveguide 301 is illustrated in FIG. 3. In this implementation, first end surface 303 serves as an optical entrance and second end surface 305 serves as an optical exit. Light rays 315, 317 strike first end surface 303, propagate through body 307, and exit optical waveguide 301 through second end surface 305. Light ray 315 strikes first end surface 303 more distal from optical axis 313 than light ray 317; however, both light rays 315, 317 exit second end surface 305. Moreover, each of light rays 315, 317 encounters outer surface 311 of body 307 only once, lessening the likelihood of attenuation of the amplitudes of light rays 315, 317 due to optical defects in outer surface 311. Moreover, light rays 315, 317 encounter outer surface 311 at angles of incidence that are less than the critical angle for the interface between optical waveguide 301 and medium 309.

As discussed above, the shape of the outer surface (e.g., outer surface 311) of the optical waveguide of the present invention can be changed or "tuned" based upon the particular implementation of the optical waveguide. FIG. 7 depicts a fourth illustrative embodiment of an optical waveguide 701 according to the present invention. As in the previous embodiment, optical waveguide 701 has an optical axis 703 and comprises a first end surface 705, a second end surface 707, and a body 709 extending between first end surface 705 and second end surface 707. Body 709 defines a complexly-contoured outer surface 711 and, in this embodiment, outer surface 711 is a surface of revolution about optical axis 703. In this particular embodiment, outer surface 711 is configured to reflect certain light rays while rejecting other light rays. In the implementation shown in FIG. 7, first end surface 705 serves as an optical entrance and second end surface 707 serves as an optical exit. Outer surface 711 is configured to reflect a light ray 713 toward and through second end surface 707. However, outer surface 711 is configured to reject light ray 715. Light ray 715 encounters outer surface 711 at an angle of incidence m that is greater than the critical angle for the interface between optical waveguide 711 and a medium 717 in which optical waveguide is disposed. Accordingly, only a fractional portion of the amplitude of light ray 715 is reflected in body 709, but the reflected portion is not reflected toward second end surface 707. The non-reflected portion of amplitude of light ray 715 propagates through outer surface 711 and into medium 717. Accordingly, the optical waveguide's outer surface (e.g., outer surface 311 or 711) can be shaped or tuned to accept desired light rays and to reject undesired light rays, based upon the light rays' angles of incidence at the optical entrance and where the light rays strike the optical entrance.

Generally, optical waveguides are more efficient in transmitting light when the light rays propagate parallel to the optical axis of the optical waveguide after the light rays pass through the optical entrance. This is particularly important in applications wherein a preponderance of the light propagates in generally one direction. Conventionally, the orientation of the optical waveguide is manipulated so that the maximum amplitude of light propagates substantially parallel to the optical axis of the optical waveguide. It may be impractical, or even impossible, in some potential implementations of optical waveguides to orient an optical waveguide in such a manner, for example, because of packaging constraints. The present invention, however, provides an embodiment wherein the optical entrance is canted or non-perpendicular with respect to the optical axis of the optical waveguide.

Accordingly, FIG. 8 depicts a fifth illustrative embodiment of an optical waveguide 801 having an optical axis 803 and comprising a first end surface 805, a second end surface 807, and a body 809 extending between the first end surface 805 and the second end surface 807. In the illustrated embodiment, first end surface 805 is canted or non-perpendicular with respect to optical axis 803 at a cant angle n, while second end surface 807 is substantially perpendicular to optical axis 803. Other aspects of optical waveguide 801 generally correspond to the embodiment of FIG. 3. Cant angle n is determined, for example, based upon the direction at which desired light rays propagate with respect to optical waveguide 801 and any ancillary design constraints placed upon the location and orientation of optical waveguide 801. Specifically, cant angle n is proportional to an angle p between the direction at which the desired light is propagating and optical axis 803. In other words, as angle p increases, so does cant angle n.

In one particular implementation, as shown in FIG. 8, first end surface 805 serves as an optical entrance and second end surface 807 serves as an optical exit. First end surface 805 is canted or non-perpendicular with respect to optical axis 803 at cant angle n, such that a light ray 811, striking first end surface 805 at angle p with respect to optical axis 803, is refracted at first end surface 805 into optical waveguide 801 along a path substantially parallel to optical axis 803. In some applications, it may be desirable for light rays to be refracted such that the light rays propagate in a direction within optical waveguide 801 other than parallel to optical axis 803. In such applications, cant angle n is altered to produce the desired propagation path. Embodiments other than the particular construction illustrated in FIG. 8 are within the scope of the present invention.

Moreover, the scope of the present invention encompasses a generally frustoconical, optical waveguide having a canted end surface. Accordingly, a sixth illustrative embodiment of the present invention is depicted in FIG. 9, wherein an optical waveguide 901 has an optical axis 903 and comprises a first end surface 905, a second end surface 907, and a frustoconical body 909 extending between first end surface 905 and second end surface 907. First end surface 905 is canted or non-perpendicular with respect to optical axis 903. Conventional, frustoconical, optical waveguides have end surfaces that are substantially perpendicular to optical axes of the waveguides. Optical waveguide 901 of the present invention, however, has improved optical transmission properties over conventional, frustoconical, optical waveguides due to canted first end surface 905 and allows optical waveguide 901 to be oriented such that light rays striking first end surface 905, propagating in a direction that is non-parallel with respect to optical axis 903, are refracted at first end surface 805 into optical waveguide 901 along paths substantially parallel to optical axis 903.

In some applications, it is desirable to only allow light waves of a certain wavelength or light waves within a certain range of wavelengths to fully propagate through an optical waveguide. Accordingly, FIG. 10 depicts a seventh illustrative embodiment of an optical waveguide 1001 according to the present invention. In this embodiment, optical waveguide 1001 has an optical axis 1003 and comprises a first end surface 1005 and a second end surface 1007. Optical waveguide 901 further comprises a first body portion 1009, extending between first end surface 1005 and a first intermediate surface 1011, and a second body portion 1013, extending between second end surface 1007 and a second intermediate surface 1015. An optical filter 1017 is disposed between first intermediate surface 1011 and second intermediate surface 1015. Generally, optical filters selectively allow light having certain properties, such as a particular range of wavelengths, to propagate therethrough. Preferably, optical filter 1017 is disposed as close to an optical entrance (e.g., first end surface 1005) of optical waveguide 1001 as practical. The selection of filter 1017 is highly implementation specific. In various embodiments, filter 1017 may comprise an absorptive filter, a reflective filter, a monochromatic filter, an infrared filter, an ultraviolet filter, a neutral density filter, a longpass filter, a shortpass filter, a bandpass filter, a polarization filter, or the like.

In one embodiment, an optical grease is disposed between optical filter 1017 and first intermediate surface 1011 and between optical filter 1017 and/or second intermediate surface 1015 to minimize undesirable optical aberrations. Optical filter 1017, however, may be rigidly attached to first intermediate surface 1011 and/or second intermediate surface 1015 or may be integral with first intermediate surface 1011 and/or second intermediate surface 1015.

Any of the embodiments of the present invention may include absorptive or reflective cladding, or may omit such cladding. For example, in an eighth illustrative embodiment of the present invention, optical waveguide 1001 of FIG. 10 includes a cladding layer 1101 disposed on an outer surface 1103 of second body portion 1013, as shown in FIG. 11. It should be noted that, in embodiments including reflective cladding, light rays that would otherwise exit through outer surfaces of the optical waveguide will be reflected back into the optical waveguide and through the optical entrance. Moreover, it should be noted that the outer surfaces (e.g., outer surfaces 311, 711, and the like) of the optical waveguides in any of the embodiments of the present invention may include ridge or dimple features to affect the reflective characteristics of the outer surfaces.

Figure 12:
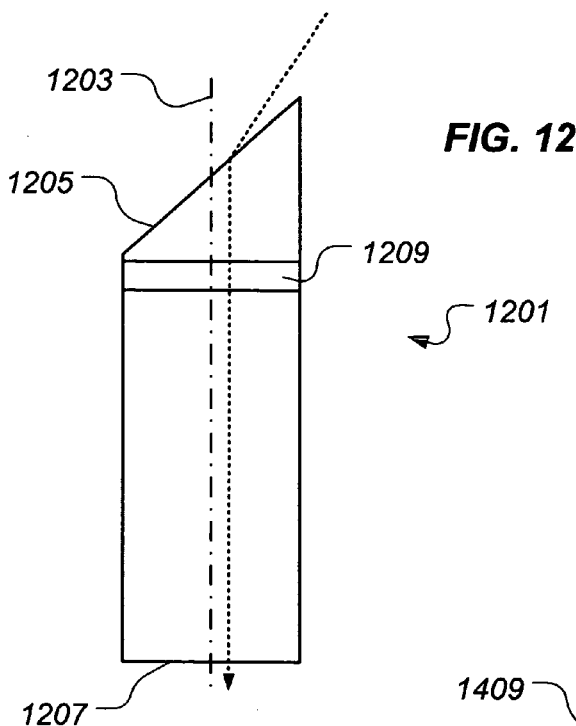
FIG. 12 is a stylized, side, elevational view of an eighth illustrative embodiment of an optical waveguide according to the present invention.

A canted end surface may also be applied to generally right-cylindrical optical waveguides and such optical waveguides are encompassed by the scope of the present invention. For example, in a ninth illustrative embodiment of the present invention, a generally right-cylindrical optical waveguide 1201 is depicted in FIG. 12. Optical waveguide 1201 includes an optical axis 1203 and comprises a first end surface 1205 that is canted or non-perpendicular with respect to optical axis 1203. In the illustrated embodiment, optical waveguide 1201 further comprises a second end surface 1207 that is substantially perpendicular to optical axis 1203. Optical waveguide 1201 includes a filter 1209, generally corresponding to filter 1017 of FIG. 10, which may be omitted in other embodiments.

Figure 13:
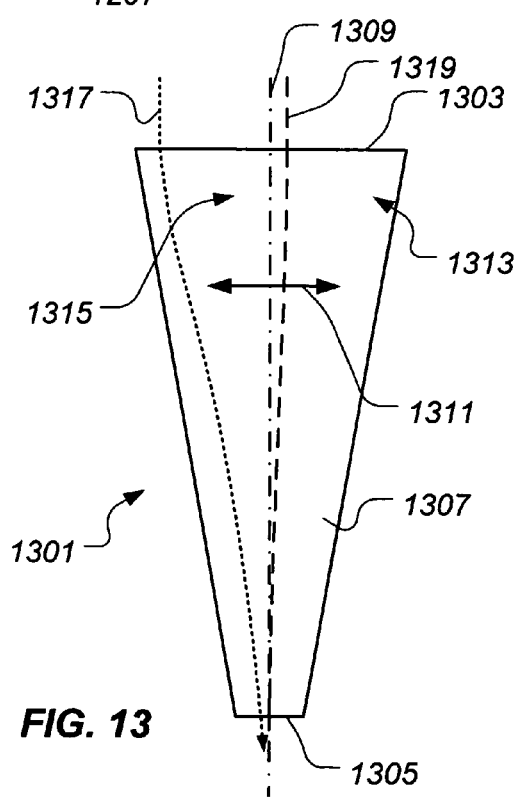
FIG. 13 is a stylized, side, elevational view of a ninth illustrative embodiment of an optical waveguide according to the present invention.

FIG. 13 depicts a tenth illustrative embodiment of an optical waveguide 1301 according to the present invention. In this embodiment, optical waveguide 1301 is generally frustoconical in shape and comprises a first end surface 1303, a second end surface 1305, and a body 1307 extending between first end surface 1303 and second end surface 1305. However, body 1307 comprises a gradient-index (GRIN) or step-index material that exhibits a progressively higher refractive index proportional to a radial distance from an optical axis 1309 of the optical waveguide 1301. In the illustrated embodiment, the refractive index of body 1307 increases in the directions indicated by a double-headed arrow 1311. For example, the refractive index of body 1307 at 1313 is greater than at 1315. Accordingly, a light ray 1317 entering optical waveguide 1301 at first end surface 1305 is refracted to a greater degree as light ray 1317 propagates toward second end surface 1307 than a light ray 1319.

Figure 14:
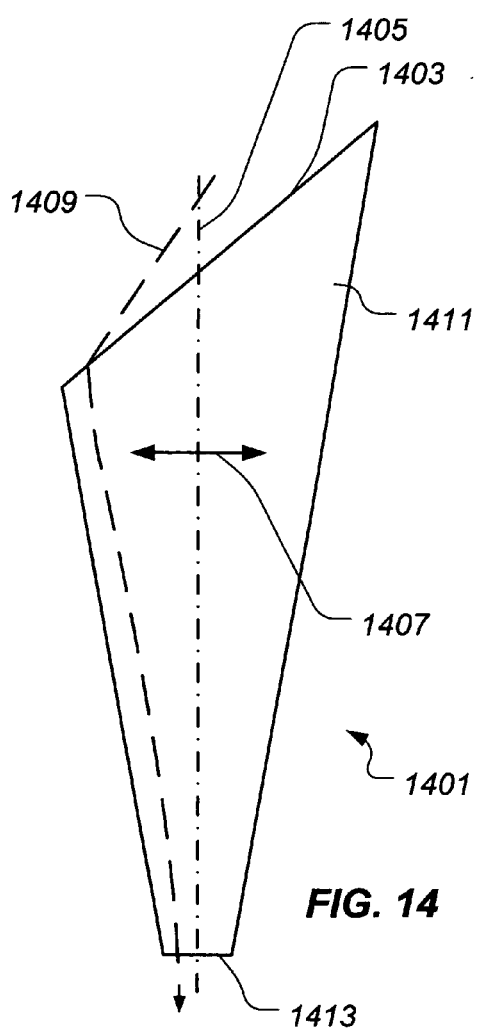
FIG. 14 is a stylized, side, elevational view of a tenth illustrative embodiment of an optical waveguide according to the present invention.

While first end surface 1303 of optical waveguide 1301 is illustrated as being substantially perpendicular to optical axis 1309, the scope of the present invention is not so limited. Rather, in an eleventh illustrative embodiment of the present invention depicted in FIG. 14, an optical waveguide 1401 comprising a GRIN or step-index material comprises a first end surface 1403 that is canted or non-perpendicular with respect to an optical axis 1405 of optical waveguide 1401. As in the embodiment of FIG. 13, the refractive index of optical waveguide 1401 increases in the directions indicated by a double-headed arrow 1407. In the particular implementation shown in FIG. 14, a light ray 1409 enters optical waveguide 1401 at first end surface 1403, which serves as an optical entrance. Immediately within a body 1411 of optical waveguide 1401, light ray 1409 propagates substantially parallel to optical axis 1405. However, the GRIN or step-index material of body 1411 refracts light ray 1409 toward optical axis 1405 and a second end surface 1413 of optical waveguide 1401.

It should be noted that, while the first end surfaces (e.g., first end surfaces 303, 705, 805, 905, 1005, 1205, 1303, and 1403) are discussed herein as serving as optical entrances and the second end surfaces (e.g., second end surfaces 305, 707, 807, 907, 1007, 1207, 1305, and 1413), the scope of the present invention is not so limited. Rather, in some applications, the second end surfaces will serve as optical entrances and the first end surfaces will serve as optical exits.

Figure 15:
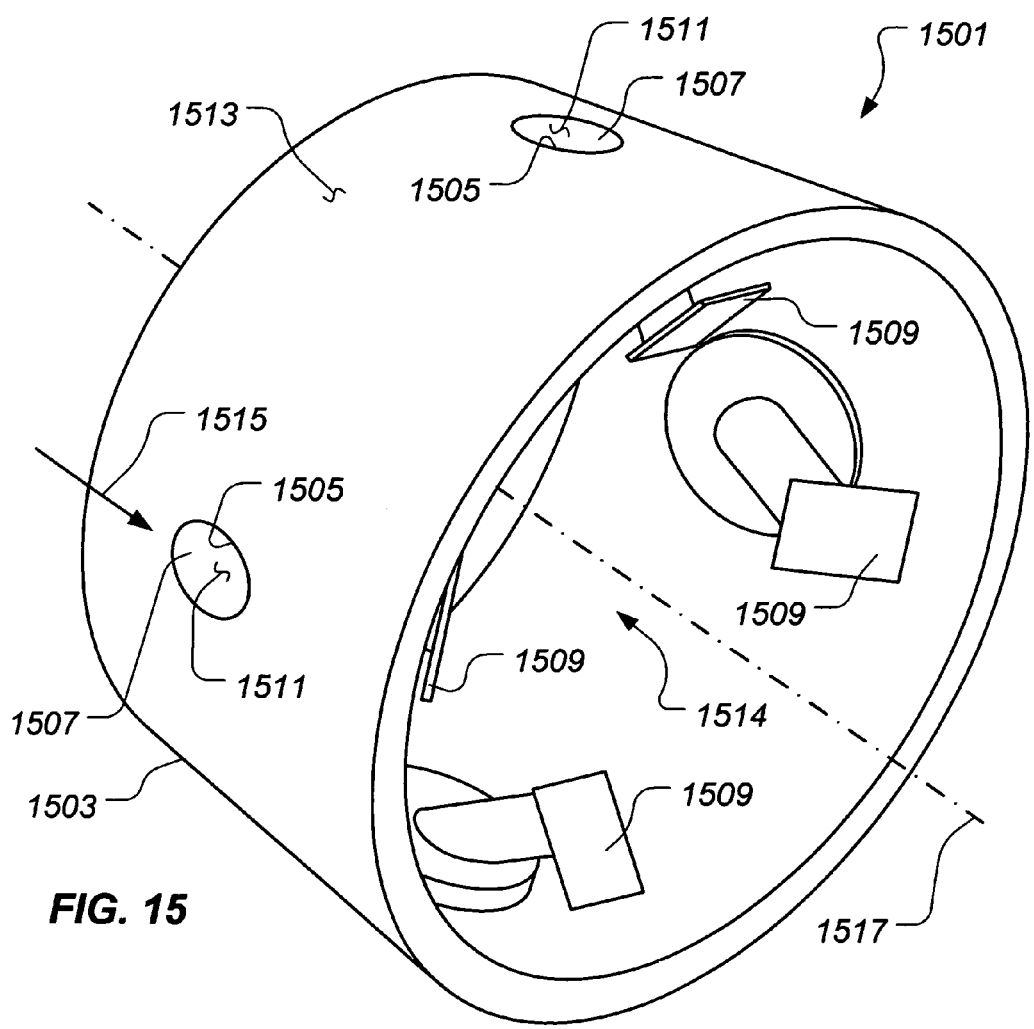
FIG. 15 is a perspective view of a first illustrative embodiment of a seeker assembly according to the present invention.
Figure 16:
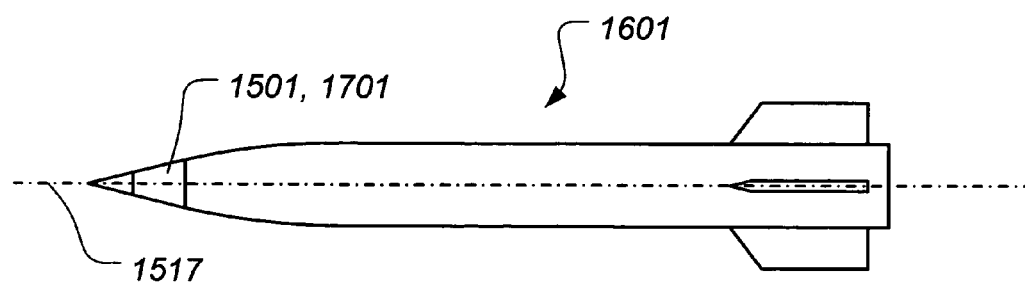
FIG. 16 is a stylized, top, plan view of a missile or rocket according to the present invention.

FIG. 15 depicts a first illustrative application for the optical waveguide of the present invention. In this particular embodiment, a seeker assembly 1501 of a guidance system for a missile or rocket, such as the illustrative embodiment of a missile or rocket 1601 according to the present invention depicted in FIG. 16, comprises a housing 1503 defining a plurality of openings 1505 in which a corresponding plurality of optical waveguides 1507 are disposed. Such a seeker assembly may be adapted for use in other types of vehicles, however, and such seeker assemblies and vehicles are within the scope of the present invention. While the illustrated embodiment provides four openings 1505 and four optical waveguides 1507, the scope of the present invention is not so limited. Rather, the scope of the present invention encompasses a seeker assembly incorporating any suitable number of openings 1505 and optical waveguides 1507, for example, one or more openings 1505 and a corresponding one or more optical waveguides 1507.

In the illustrated embodiment, each optical waveguide 1507 extends to a detector 1509, which detects light waves that have propagated optical waveguide 1507 attached thereto. Alternatively, a plurality of optical waveguides 1507 may be optically coupled to a single detector 1509. First end surfaces 1511 of optical waveguides 1507 serve as optical entrances and are substantially flush with an outer surface 1513 of housing 1503. In some embodiments, housing 1503 may comprise a radome or a portion of a radome. The present invention allows non-hemispherical radomes, such as radomes having conic-like shapes, to be utilized. Moreover, the use of an optical waveguide according to the present invention allows a central volume, generally at 1514, to be available for other components of the missile or rocket. While optical waveguides 1507 may comprise any embodiment of an optical waveguide according to the present invention, optical waveguides 1507 preferably have a construction corresponding to the embodiment of FIG. 8, FIG. 9, or FIG. 14.

In some embodiments, outer surfaces (e.g., outer surfaces 311, 711, 1103, or the like) of optical waveguides 1507 are complexly-contoured. In such embodiments, the shape of the outer surface is configured to allow light rays, such as light ray 1515 propagating in a particular direction or within a range of directions to propagate through optical waveguides 1507. For example, the outer surfaces of optical waveguides 1507 may be configured or tuned to allow light rays propagating generally parallel with a boresight axis 1517 of seeker assembly 1501 to propagate through optical waveguides 1507 to detectors 1509. In other embodiments, however, the outer surfaces optical waveguides 1507 may be configured or tuned to allow light rays propagating in directions other than parallel to boresight axis 1517 to propagate through optical waveguides 1507 to detectors 1509.

Alternatively, optical waveguides 1507 may comprise GRIN or step-index materials that are configured or tuned to allow light rays propagating generally parallel with a boresight axis 1517 of seeker assembly 1501 to propagate through optical waveguides 1507 to detectors 1509. In other embodiments, however, the GRIN or step-index materials of optical waveguides 1507 may be configured or tuned to allow light rays propagating in directions other than parallel to boresight axis 1517 to propagate through optical waveguides 1507 to detectors 1509.

It should be noted that the present invention does not require all of optical waveguides 1507 to have the same configuration. For example, some of optical waveguides 1507 may be configured or tuned to allow light rays propagating substantially parallel with boresight axis 1517 to propagate therethrough, while other optical waveguides are configured or tuned to allow light rays propagating in other directions to propagate therethrough. Moreover, some optical waveguides 1507 may have complexly-contoured outer surfaces while others comprise GRIN or step-index materials. Any suitable combination of embodiments of the present invention may be used as optical waveguides 1507.

Figure 17:
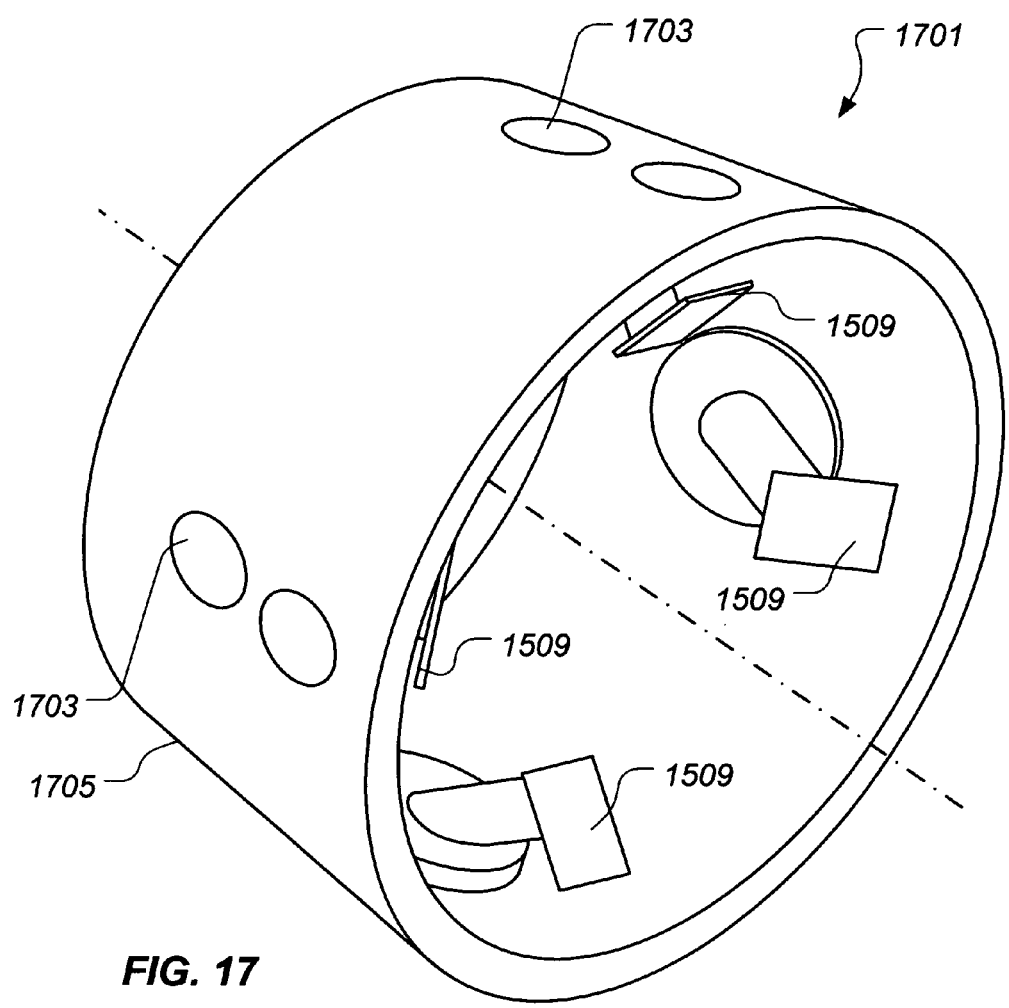
FIG. 17 is a perspective view of a second illustrative embodiment of a seeker assembly according to the present invention.

While FIG. 15 illustrates optical waveguides 1507 being generally symmetrically, radially disposed about housing 1503, the scope of the present invention is not so limited. Other configurations are possible and within the scope of the present invention. For example, FIG. 17 depicts an alternative, illustrative embodiment of a seeker assembly 1701 wherein optical waveguides 1703 are both radially and axially disposed about a housing 1705. Note that optical waveguides 1703 may comprise any embodiment of an optical waveguide according to the present invention, optical waveguides 1703 preferably have a construction corresponding to the embodiment of FIG. 8, FIG. 9, or FIG. 14. It should also be noted that light exiting from optical adjacent optical waveguides 1703 may be optically coupled to a single detector 1509, as illustrated in FIG. 17, or the light from each individual optical waveguide 1703 may be coupled to corresponding, individual detectors 1509.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An optical waveguide having an optical axis, the optical waveguide comprising:
    a substantially planar first end surface;
    a second end surface, such that the second end surface is smaller than the first end surface; and
    a body extending between the first end surface and the second end surface, the body defining a complexly-contoured outer surface;
    wherein the body comprises:
        a first intermediate surface;
        a first body portion extending between the first end surface and the first intermediate surface;
        a second intermediate surface;
        a second body portion extending between the second intermediate surface and the second end surface; and
        an optical filter disposed between the first intermediate surface and the second intermediate surface;
    wherein the first end surface is canted with respect to the optical axis of the optical waveguide.

2. The optical waveguide, according to claim 1, wherein the first end surface is an optical entrance and the second end surface is an optical exit.

3. The optical waveguide, according to claim 1, wherein the second end surface is an optical entrance and the first end surface is an optical exit.

4. The optical waveguide, according to claim 1, wherein the second end surface is non-perpendicular with respect to the optical axis of the optical waveguide.

5. The optical waveguide, according to claim 1, wherein the complexly-contoured outer surface is a surface of revolution about an optical axis of the optical waveguide.

6. The optical waveguide, according to claim 5, wherein the surface of revolution is defined by a non-linear curve rotated about the optical axis.

7. The optical waveguide, according to claim 5, wherein the surface of revolution is defined by a plurality of curves that are each rotated partway about the optical axis, such that adjacent surfaces defined by the plurality of rotated curves are joined.

8. The optical waveguide, according to claim 1, wherein the complexly-contoured outer surface is a frustum of a paraboloid of revolution.

9. The optical waveguide, according to claim 1, wherein the complexly-contoured outer surface is one of: circular, elliptical, and rectangular in cross-section substantially perpendicular to an optical axis of the optical waveguide.

10. The optical waveguide, according to claim 1, wherein the body comprises one of: glass, a polymeric material, and acrylic.

11. The optical waveguide, according to claim 1, wherein first end surface is an optical entrance and the optical filter is disposed proximate the first end surface.

12. The optical waveguide, according to claim 1, wherein the second end surface is an optical entrance and the optical filter is disposed proximate the second end surface.

13. The optical waveguide, according to claim 1, wherein the optical filter is joined to at least one of the first intermediate surface and the second intermediate surface.

14. The optical waveguide, according to claim 1, further comprising:
optical grease disposed between the optical filter and at least one of the first intermediate surface and the second intermediate surface.

15. The optical waveguide, according to claim 1, further comprising:
cladding disposed on the complexly-contoured outer surface.

16. The optical waveguide, according to claim 1, wherein the complexly-contoured outer surface is configured to direct substantially all of the light propagating through the body toward the second end surface.

17. The optical waveguide, according to claim 1, wherein the complexly-contoured outer surface is configured to direct light striking the first end surface from a first direction toward the second end surface and is configured to direct light striking the first end surface from a second direction away from the second end surface.

18. The optical waveguide, according to claim 1, wherein the complexly-contoured outer surface is configured to minimize attenuation of light propagating through the body.

19. The optical waveguide, according to claim 1, wherein the optical waveguide is operably associated with one of: a vehicle and a seeker assembly.

20. A seeker assembly, comprising:
a detector; and
an optical waveguide having an optical axis and comprising:
  a substantially planar optical entrance;
  an optical exit disposed proximate the detector, the optical exit being smaller than the optical entrance; and
  a body extending between the optical entrance and the optical exit, the body defining a complexly-contoured outer surface;
  wherein the body comprises:
    a first intermediate surface;
    a first body portion extending between the optical entrance and the first intermediate surface;
    a second intermediate surface;
    a second body portion extending between the second intermediate surface and the optical exit; and
    an optical filter disposed between the first intermediate surface and the second intermediate surface;
  wherein the optical entrance is canted with respect to the optical axis of the optical waveguide.

21. The seeker assembly, according to claim 20, wherein the complexly-contoured outer surface is a surface of revolution about an optical axis of the optical waveguide.

22. The seeker assembly, according to claim 20, wherein the optical exit is non-perpendicular with respect to the optical axis of the optical waveguide.

23. The seeker assembly, according to claim 20, wherein the optical waveguide is configured to direct light striking the optical entrance from a first direction toward the optical exit and is configured to direct light striking the optical entrance from a second direction away from the optical exit.

24. The seeker assembly, according to claim 20, wherein the complexly-contoured outer surface is a frustum of a paraboloid of revolution.

25. The seeker assembly, according to claim 20, wherein the complexly-contoured outer surface is one of: circular, elliptical, and rectangular in cross-section substantially perpendicular to an optical axis of the optical waveguide.

26. The seeker assembly, according to claim 20, further comprising:
a housing defining an opening;
wherein the optical waveguide is disposed in the opening and the optical entrance is disposed at an outer surface of the housing.

27. The seeker assembly, according to claim 20, wherein the seeker assembly is operably associated with a vehicle.

28. A seeker assembly, comprising:
a housing defining a plurality of openings;
a plurality of optical waveguides corresponding to the plurality of openings, one of the plurality of optical waveguides being disposed in each of the openings, each of the optical waveguides having an optical axis and comprising:
  a substantially planar optical entrance;
  an optical exit, such that the optical exit is smaller than the optical entrance; and
  a body extending between the optical entrance and the optical exit, the body defining a complexly-contoured outer surface;
  wherein the body comprises:
    a first intermediate surface;
    a first body portion extending between the optical entrance and the first intermediate surface;
    a second intermediate surface;
    a second body portion extending between the second intermediate surface and the optical exit; and
    an optical filter disposed between the first intermediate surface and the second intermediate surface;
  wherein the optical entrance is canted with respect to the optical axis of the optical waveguide; and
a plurality of detectors, such that each of the optical waveguides leads to a detector of the plurality of detectors.

29. The seeker assembly, according to claim 28, wherein the optical waveguides of the plurality of optical waveguides are radially disposed about the housing.

30. The seeker assembly, according to claim 28, wherein the optical waveguides of the plurality of optical waveguides are radially and axially disposed about the housing.

* * * * *